(12) United States Patent
Mori

(10) Patent No.: US 6,790,421 B2
(45) Date of Patent: Sep. 14, 2004

(54) METHOD FOR TREATING EXHAUST GAS CONTAINING FLUORINE-CONTAINING COMPOUND

(75) Inventor: Yoichi Mori, Kanagawa (JP)

(73) Assignee: Ebara Corporation, Tokyo (JP)

( * ) Notice: Subject to any disclaimer, the term of this patent is extended or adjusted under 35 U.S.C. 154(b) by 162 days.

(21) Appl. No.: 10/257,264

(22) PCT Filed: Apr. 11, 2001

(86) PCT No.: PCT/JP01/03117

§ 371 (c)(1),
(2), (4) Date: Oct. 10, 2002

(87) PCT Pub. No.: WO01/76725

PCT Pub. Date: Oct. 18, 2001

(65) Prior Publication Data

US 2003/0103883 A1 Jun. 5, 2003

(30) Foreign Application Priority Data

Apr. 12, 2000 (JP) ........................................ 2000-110668

(51) Int. Cl.$^7$ ................................................ A62D 3/00
(52) U.S. Cl. .................................... 423/240 S; 422/177
(58) Field of Search ..................... 423/240 R, 240 S, 423/241; 422/168, 177, 178

(56) References Cited

FOREIGN PATENT DOCUMENTS

| EP | 885648 | 12/1998 |
|---|---|---|
| JP | 2569421 | 10/1996 |
| JP | 2001-137659 | 5/2001 |
| WO | 00/09258 | 2/2000 |

OTHER PUBLICATIONS

U.S. application Ser. No. 09/714,220, no date.

*Primary Examiner*—Stanley S. Silverman
*Assistant Examiner*—Edward M. Johnson
(74) *Attorney, Agent, or Firm*—Wenderoth, Lind & Ponack, L.L.P.

(57) ABSTRACT

The present invention aims to provide exhaust gas treatment processes and systems capable of efficiently treating perfluoro-compounds (PFCs) for a long period. It also aims to provide exhaust gas treatment processes and systems capable of efficiently treating oxidizing gases such as $F_2$, $Cl_2$ and $Br_2$; acidic gases such as HF, HCl, HBr, $SiF_4$, $SiCl_4$, $SiBr_4$ and $COF_2$; and CO in addition to PFCs.

In order to attain these objects, an exhaust gas treatment process of the present invention is a process for treating an exhaust gas containing a fluorine-containing compound with a catalyst after solids in said exhaust gas have been separated, said catalyst being a γ-alumina having a crystal structure showing diffraction lines having an intensity of 100 or more at the following five diffraction angles 2θ: 33°±1°, 37°±1°, 40°±1°, 46°±1° and 67°±1° measured by an X-ray diffractometer. An exhaust gas treatment process according to a preferred embodiment of the present invention is characterized in that at least one decomposition-assisting gas selected from $H_2$, $O_2$ and $H_2O$ is further added to the exhaust gas.

12 Claims, 1 Drawing Sheet

METHOD FOR TREATING EXHAUST GAS CONTAINING FLUORINE-CONTAINING COMPOUND

TECHNICAL FIELD

The present invention relates to processes for treating exhaust gases containing fluorine-containing compounds, particularly to exhaust gas treatment processes and systems capable of efficiently and long treating perfluoro-compounds discharged during the step of dry-cleaning the inner faces or the like of semiconductor manufacturing apparatus with perfluoro-compounds such as $C_2F_6$, $C_3F_8$, $CF_4$, $CHF_3$, $SF_6$, $NF_3$, etc. or the step of etching various films in the semiconductor industry. In more preferred embodiments, the present invention relates to exhaust gas treatment processes and systems capable of efficiently treating oxidizing gases such as $F_2$, $Cl_2$ and $Br_2$; acidic gases such as HF, HCl, HBr, $SiF_4$, $SiCl_4$, $SiBr_4$ and $COF_2$; and CO in addition to the perfluoro-compounds.

BACKGROUND ART

In the semiconductor industry, many kinds of noxious gases are used during semiconductor manufacturing processes, which raises concerns about environmental pollution. Perfluoro-compounds (PFCs) contained in exhaust gases from etching processes or CVD processes are global warming gases for which a removal system should be urgently established.

PFC removal processes have been proposed such as destruction and recovery techniques, especially destruction techniques including various catalytic pyrolysis methods. For example, proposed prior processes include an exhaust gas treatment process using an alumina-based catalyst loaded with various metals; an exhaust gas treatment process using alumina containing 0.1% by weight or less of Na as metal; an exhaust gas treatment process involving contacting exhaust gases with molecular oxygen in the presence of alumina; a process for treating exhaust gases containing fluorine-containing compounds using an Al-containing catalyst in the presence of water vapor at a temperature of 200–800° C.; a process for treating exhaust gases containing fluorine-containing compounds using various metal catalysts in the presence of molecular oxygen and water; etc.

However, these prior proposals had the problems that fluorine-containing compounds were decomposed with still too low efficiency to obtain sufficient treatment performance or a long continuous treatment could not be attained with a given treatment system because of the short life of the alumina catalysts.

Thus, an object of the present invention is to solve these problems of the prior art and to provide a process and a system for treating exhaust gases containing fluorine-containing compounds with high PFC decomposition efficiency, which allows PFCs to be effectively decomposed and eliminated for a long period.

DISCLOSURE OF THE INVENTION

As a result of careful studies to solve the above problems, we found that the above object can be achieved by using an alumina having a specific crystal structure among those having various crystal structures. Accordingly, the present invention relates to a process for treating an exhaust gas containing a fluorine-containing compound with a catalyst, characterized in that said catalyst is a γ-alumina having a crystal structure showing diffraction lines having an intensity of 100 or more at the following five diffraction angles 2θ: 33°±1°, 37°±1°, 40°±1°, 46°±1° and 67°±1° measured by an X-ray diffractometer.

THE MOST PREFERRED EMBODIMENTS OF THE INVENTION

Figure 1:
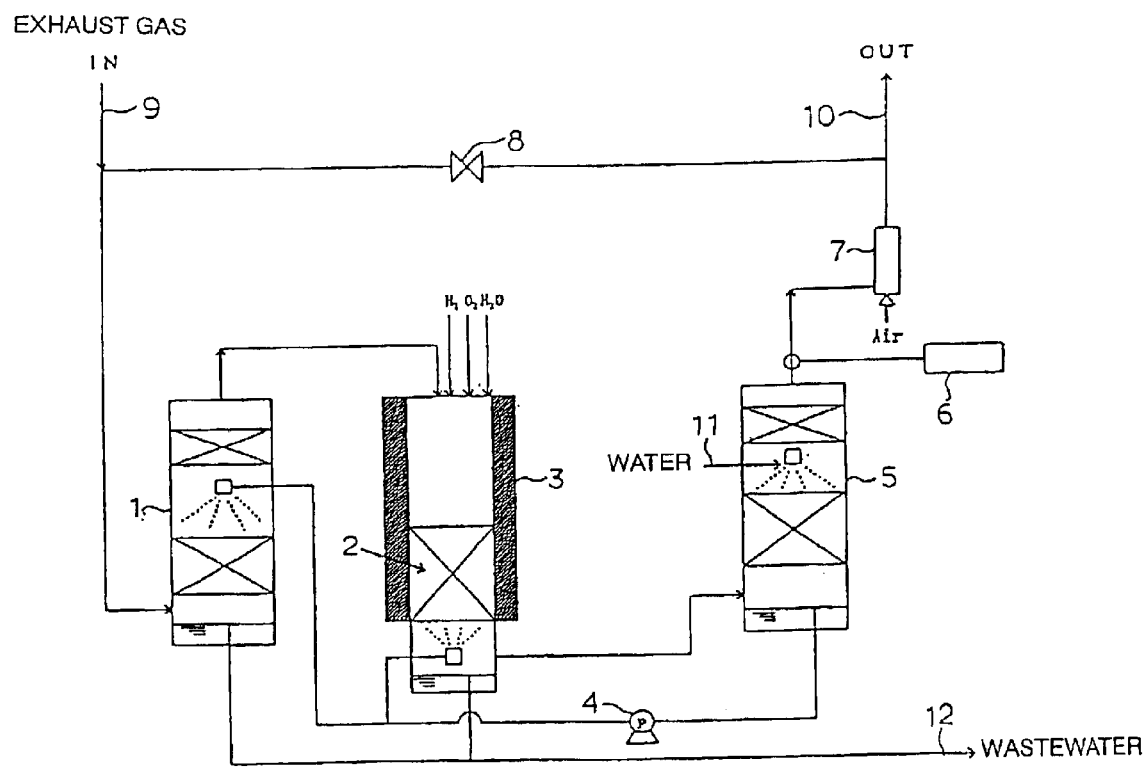
FIG. 1 is a schematic flow diagram of an exhaust gas treatment system according to an embodiment of the present invention.

The present invention is further described in detail below.

First, the γ-alumina having the crystal structure defined above used in the present invention is explained.

Basically, activated alumina refers to an intermediate between hydrates (trihydrate: $Al_2O.3H_2O$, monohydrate: $Al_2O_3.H_2O$) and α-alumina (having a dense structure), and is represented by $Al_2O_3$.

Activated alumina is classified into seven types (κ:kappa, θ:theta, δ:delta, γ:gamma, η:eta, χ:chi and ρ:rho) of metastable aluminas. These aluminas are obtained by heat treatment of hydrated alumina and contain 0–0.5 moles of water per 1 mole of $Al_2O_3$ depending on the temperature of the heat treatment.

γ-alumina is one of these activated aluminas and said to be unstable and highly active when it has a specific crystal structure (the pattern of X-ray diffraction peaks). Various γ-aluminas having different activities are produced depending on the nature of the hydrate or the type of the preparation process. We examined such γ-aluminas having various crystal structures for their performance of decomposing fluorine-containing compounds depending on the difference in crystal structure to find that a γ-alumina having a crystal structure showing diffraction lines having an intensity of 100 or more at the following five diffraction angles 2θ: 33°±1°, 37°±1°, 40°±1°, 46°±1° and 67°±1° measured by an X-ray diffractometer (the γ-alumina having this crystal structure is hereinafter referred to as "the present γ-alumina") has especially excellent decomposition performance, and we accomplished the present invention on the basis of this finding.

The γ-alumina having such a crystal structure can be obtained by, for example, sintering alumina sol into spherical alumina hydrogel ($Al(OH)_y.nH_2O$).

The $Na_2O$ content in the present γ-alumina is preferably 0.02 wt % or less in the total amount of the γ-alumina in view of the performance of decomposing fluorine-containing compounds.

The γ-alumina used in the present invention can be in any shape so far as it has the crystal structure defined above, but it is preferably spherical for ease of handling. The particle size of the γ-alumina used in the present invention is preferably smaller to provide a larger contact area unless the resistance to gas transmission increases during gas feeding, especially 0.8 mm–2.6 mm.

Specific examples of such γ-alumina are commercially available from Mizusawa Chemical under trade name "Neobead GB-08", for example.

In order to perform exhaust gas treatment processes of the present invention, an exhaust gas containing a fluorine-containing compound can be treated by using the present γ-alumina having the crystal structure defined above as a catalyst. Preferably, the present γ-alumina is heated at 600–900° C., more preferably 650–750° C.

Fluorine-containing compounds that can be treated by the present invention include fluorohydrocarbons such as $CHF_3$; and perfluoro-compounds (PFCs) such as $C_2F_6$, $C_3F_8$, $SF_6$, $NF_3$, etc.

Said exhaust gas containing a fluorine-containing compound may be exhaust gas discharged during the step of dry-cleaning the inner faces or the like of semiconductor manufacturing apparatus or the step of etching various films in the semiconductor industry.

In a preferred embodiment of the present invention, a process capable of not only efficiently decomposing PFCs but also treating oxidizing gases, acidic gases and CO is provided.

Exhaust gases discharged from semiconductor manufacturing processes contain not only PFCs but also oxidizing gases such as $F_2$, $Cl_2$ and $Br_2$; acidic gases such as HF, $SiF_4$, $COF_2$, HCl, HBr, $SiCl_4$, and $SiBr_4$; and CO. Oxidizing gases such as $F_2$, $Cl_2$ and $Br_2$ had the problem that they could not be completely treated with water but required the use of an alkali agent or a reducing agent when they were to be wet-treated, which resulted in complicated control or apparatus and added costs. CO is generated as a by-product during decomposition of PFCs and must be decomposed and eliminated.

In a preferred embodiment of the present invention, the exhaust gas to be treated is combined with at least one decomposition-assisting gas selected from $H_2$, $O_2$ and $H_2O$ and subjected to the treatment described above. By using such a decomposition-assisting gas, the catalyst life of the present γ-alumina can be further remarkably extended and the exhaust gas can be efficiently treated for a longer period. The CO generated as a by-product during the decomposition process of PFCs can also be efficiently decomposed.

When said decomposition-assisting gas is added, fluorine-containing compounds such as PFCs, oxidizing gases and CO are decomposed into acidic gases and $CO_2$ according to the following formulae.

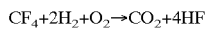
$CF_4+2H_2+O_2\rightarrow CO_2+4HF$

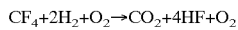
$CF_4+2H_2+O_2\rightarrow CO_2+4HF+O_2$

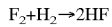
$F_2+H_2\rightarrow 2HF$

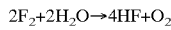
$2F_2+2H_2O\rightarrow 4HF+O_2$

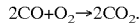
$2CO+O_2\rightarrow 2CO_2$.

Namely, $CF_4$ is decomposed into $CO_2$ and HF by the reaction with $H_2$ and $O_2$ or $H_2O$, oxidizing gases such as $F_2$ are decomposed into acidic gases such as HF by the reaction with $H_2$ or $H_2O$ and CO is oxidized into $CO_2$.

$H_2$, $O_2$ and/or $H_2O$ used to treat PFCs here are preferably added in an amount of $H_2$ and/or $H_2O$ equivalent to or more than the necessary number of moles for converting F atoms in PFCs into HF and in an amount of $O_2$ equivalent to or more than the necessary number of moles (minimum) for converting C atoms into $CO_2$. More preferably, $H_2$ and/or $H_2O$ is 6–20 times the equivalent per mole of PFCs, while $O_2$ is equal to or more than the above minimum plus 1 mole. For treating oxidizing gases, $H_2$ is preferably added in an amount equivalent to or more than the necessary number of moles for converting halogen atoms (X) in the oxidizing gases into acidic gases (HX).

An embodiment of a system for performing a treatment process of the present invention comprises a solids separator for separating solids in the exhaust gas, a catalytic treatment apparatus packed with the present γ-alumina having the crystal structure defined above and an acidic gas treatment apparatus, which are connected via piping.

The solids separator and the acidic gas treatment apparatus here are not specifically limited, but can be any commonly known ones. For example, water scrubbers (water spray columns) or the like can be used as the solids separator and the acidic gas treatment apparatus.

The catalytic treatment apparatus described above preferably has a heater for heating the γ-alumina catalyst of the present invention. Specifically, the catalytic treatment apparatus may consist of a cylindrical column packed with the present γ-alumina and surrounded by a heater around the outer peripheral face and connected at the top to an exhaust gas feed pipe and at the bottom to a discharge pipe for treated exhaust gas.

An exhaust gas treatment process according to a preferred embodiment of the present invention can be performed as follows, for example.

An exhaust gas is first passed through the solids separator at a preliminary stage where solids are eliminated. The γ-alumina of the present invention in the packed column is heated by the heater at a temperature of 600–900° C., and then the exhaust gas freed of solids is combined with the decomposition-assisting gas and passed through the catalytic treatment apparatus packed with the γ-alumina where fluorine-containing compounds such as PFCs are decomposed into acidic gases and $CO_2$ simultaneously with oxidizing gases and CO by the catalytic action of the γ-alumina. Thus, the decomposition-assisting gas and the exhaust gas are preferably injected as a mixed gas into a catalyst bed formed by packing the catalyst.

Only acidic gases (HX) and $CO_2$ exist in the exhaust gas exiting the catalytic treatment apparatus, and the acidic gases can be eliminated in the acidic gas treatment apparatus such as a water spray column to complete exhaust gas treatment.

FIG. 1 shows a schematic flow diagram of an exhaust gas treatment system according to a preferred embodiment of the present invention. In FIG. 1, various references represent the following elements: 1: solids separator (water spray column); 2: packed bed of γ-alumina having a specific crystal structure according to the present invention; 3: catalytic treatment apparatus; 4: washing water circulating pump; 5: acidic gas treatment apparatus (water spray column); 6: FT-IR spectrometer; 7: air ejector; 8: bypass valve.

Exhaust gas 9 containing PFCs, oxidizing gases, acidic gases and CO is first passed through solids separator 1 consisting of a spray column where solids and Si compounds are eliminated. Then, it is passed through catalytic treatment apparatus 3 packed with the present γ-alumina 2 where $H_2$, $O_2$ and/or $H_2O$ are introduced to decompose the PFCs, oxidizing gases and CO into acidic gases and $CO_2$. At a late stage, it is further freed of the acidic gases in acidic gas treatment apparatus 5 consisting of a spray column and discharged as treated gas 10. Preferably, air ejector 7 is provided to control the pressure in these treatment apparatus and FT-IR spectrometer 6 is incorporated into the system to manage the treated gas. As for the water used in the spray columns, water 11 is introduced into the spray tower of acidic gas treatment apparatus 5 and used there, and this used water is directed to the spray column of solids separator 1 via washing water circulating pump 4 and sprayed there and then discharged as wastewater.

EXAMPLES

The following examples further illustrate the present invention without, however, limiting the invention thereto.

Example 1

A γ-alumina having a crystal structure showing diffraction lines having an intensity of 100 or more at the following five diffraction angles 2θ: 33°±1°, 37°±1°, 40°±1°, 46°±1° and 67°±1° available from Mizusawa Chemical (under trade name "Neobead GB-08"; $Na_2O$ content 0.01 wt % or less) having a particle diameter of 0.8 mm was used. The crystal structure of Neobead GB-08 was confirmed by using the X-ray diffractometer Rigaku RINT-2000 with CuKα rays as an X-ray source. The packed column used was a quartz column having an inner diameter of 25 mm packed with said γ-alumina at a bed height of 100 mm. This packed column was inserted into a ceramic electric tubular oven where the catalyst bed was heated at 800° C.

A pseudo-exhaust gas consisting of $CF_4$ diluted in $N_2$ gas was mixed with $H_2$ and $O_2$ used as decomposition-assisting gases in such amounts that the atomic weight of H in $H_2$ was equal to or more than the atomic weight of F in $CF_4$ and $O_2$ was equimolar to or more than the amount of $H_2$ introduced, and the resulting mixed gas was injected into the packed column at a flow rate of 408 sccm and inlet concentrations of 1 wt % $CF_4$, 3.0 wt % $H_2$ and 5.7 wt % $O_2$ in the mixed gas. In order to evaluate treatment performance, the treated gas discharged from the outlet of the column was analyzed at appropriate time and gas feeding was stopped to determine the amount of treated $CF_4$ from the cumulative amount of feed gas when the $CF_4$ removal efficiency dropped to 98% or less. The analysis of $CF_4$ was made by using a gas chromatograph coupled to a mass spectrometer.

As a result, the removal efficiency dropped to 98% at 920 min after gas feeding started and the treated amount was determined from the cumulative amount of $CF_4$ feed gas at that time to be 77 L/L. The CO emission level during then was constantly at or below the permissible level (25 ppm).

Example 2

The same apparatus as in Example 1 was used with the same packing amount of γ-alumina as in Example 1 to perform a treatment as follows.

The temperature was 700° C., the total gas flow rate was 408 sccm and $H_2O$ and $O_2$ were used as decomposition-assisting gases in which $H_2O$ was injected at 0.041 ml/min, i.e., 14 times the flow rate of $CF_4$ and $O_2$ was injected in an amount equivalent to or more than the necessary number of moles for converting C atoms in $CF_4$ into $CO_2$. The inlet concentrations in the resulting mixed gas were 0.88% $CF_4$ and 3.0% $O_2$, respectively.

Treatment performance was evaluated in the same manner as in Example 1 to show that treatment could be obtained at a removal efficiency of 99% or more up to 74 hours of gas feeding and that the $CF_4$ removal efficiency dropped to 98% after 94 hours of gas feeding when the treated amount was 413 L/L. During then, CO was always treated at or below the permissible level. Examples 1 and 2 were compared to reveal that more excellent decomposition performance was shown when $H_2O/O_2$ (Example 2) ware used as decomposition-assisting gases than $H_2/O_2$ even if the same γ-alumina was used.

Comparative Example 1

A control γ-alumina having a crystal structure showing diffraction lines having an intensity of 100 or more at the following three diffraction angles 2θ: 37°±1°, 46°±1° and 67°±1° available from Mizusawa Chemical (under trade name "Neobead GB-26"; $Na_2O$ content 0.02 wt %) and divided and sieved into a particle diameter of 0.8 mm was used as a catalyst. The crystal structure of Neobead GB-26 was confirmed by using the X-ray diffractometer Rigaku RINT-2000 with CuKα rays as an X-ray source.

The same test apparatus as in Example 1 was used with the same packing amount of γ-alumina as in Example 1 to perform a treatment as follows. The temperature was 700° C., the total gas flow rate was 408 sccm and $H_2O$ and $O_2$ were used as decomposition-assisting gases in which $H_2O$ was injected at 0.056 ml/min, i.e., 20 times the flow rate of $CF_4$ and $O_2$ was injected in an amount equivalent to or more than the necessary number of moles for converting C atoms in $CF_4$ into $CO_2$. The inlet concentrations in the resulting mixed gas were 0.86% $CF_4$ and 3.1% $O_2$, respectively.

Treatment performance was evaluated in the same manner as in Example 1 to show that treatment could be obtained at a removal efficiency of 99% or more up to 33 hours of gas feeding and that the $CF_4$ removal efficiency dropped to 98% after 50 hours of gas feeding when the treated amount was 214 L/L. During then, CO was always treated at or below the permissible level.

Comparative Example 2

A control γ-alumina having a crystal structure showing diffraction lines having an intensity of 100 or more at the following three diffraction angles 2θ: 37°±1°, 46°±1° and 67°+1° available from Mizusawa Chemical (under trade name "Neobead GB-45"; $Na_2O$ content 0.01 wt % or less) and divided and sieved into a particle diameter of 0.8 mm was used as a catalyst. The crystal structure of Neobead GB-45 was confirmed by using the X-ray diffractometer Rigaku RINT-2000 with CuKα rays as an X-ray source.

The same test apparatus as in Example 1 was used with the same packing amount of the control γ-alumina as in Example 1 to perform a treatment as follows. The temperature was 700° C., the total gas flow rate was 408 sccm and $H_2O$ and $O_2$ were used as decomposition-assisting gases in which $H_2O$ was injected at 0.057 ml/min, i.e., 20 times the flow rate of $CF_4$ and $O_2$ was injected in an amount equivalent to or more than the necessary number of moles for converting C atoms in $CF_4$ into $CO_2$. The inlet concentrations in the resulting mixed gas were 0.87% $CF_4$ and 3.1% $O_2$, respectively.

Treatment performance was evaluated in the same manner as in Example 1 to show that treatment could be obtained at a removal efficiency of 99% or more up to 27 hours of gas feeding and that the $CF_4$ removal efficiency dropped to 98% after 41 hours of gas feeding when the treated amount was 177 L/L. During then, CO was always treated at or below the permissible level.

Comparative Example 3

A control γ-alumina having a crystal structure showing diffraction lines having an intensity of 100 or more at the following three diffraction angles 2θ: 37°±1°, 46°±1° and 67°±1° available from Mizusawa Chemical (under trade name "Neobead RN"; Na2O content 0.48 wt %) and divided and sieved into a particle diameter of 0.8 mm was used as a catalyst. The crystal structure of Neobead RN was confirmed by using the X-ray diffractometer Rigaku RINT-2000 with CuKα rays as an X-ray source.

The same test apparatus as in Example 1 was used with the same packing amount of the control γ-alumina as in Example 1 to perform a treatment as follows.

The temperature was 700° C., the total gas flow rate was 408 sccm and $H_2O$ and $O_2$ were used as decomposition-assisting gases in which $H_2O$ was injected at 0.055 ml/min, i.e., 20 times the flow rate of $CF_4$ and $O_2$ was injected in an amount equivalent to or more than the necessary number of moles for converting C atoms in $CF_4$ into $CO_2$. The inlet concentrations in the resulting mixed gas were 0.84% $CF_4$ and 3.1% $O_2$, respectively.

Treatment performance was evaluated in the same manner as in Example 1 to show that 2950 ppm $CF_4$ was detected at the outlet after 2 hours of gas feeding when the removal efficiency dropped to 63%.

Example 2 and Comparative examples 1–3 using the same decomposition-assisting gases ($H_2O/O_2$) were compared to reveal that the γ-alumina catalyst having a specific crystal structure according to the present invention shows very excellent decomposition performance as compared with prior γ-aluminas.

Industrial Applicability

According to the present invention, exhaust gases containing noxious and global warming fluorine-containing compounds such as PFCs discharged from semiconductor-manufacturing processes can be subjected to decomposition treatment with high decomposition efficiency and high decomposition treatment performance for a long period. According to preferred embodiments of the present invention, not only PFCs but also oxidizing gases such as $F_2$, $Cl_2$ and $Br_2$; acidic gases such as HF, HCl, HBr, $SiF_4$, $SiCl_4$, $SiBr_4$ and $COF_2$; and CO can be efficiently treated.

What is claimed is:

1. A process for treating an exhaust gas containing a fluorine-containing compound with a catalyst after solids in said exhaust gas have been separated, said catalyst being a γ-alumina having a crystal structure showing diffraction lines having an intensity of 100 or more at the following five diffraction angles 2θ: 33°±1°, 37°±1°, 40°±1°, 46°±1° and 67°±1° measured by an X-ray diffractometer.

2. The process for treating an exhaust gas containing a fluorine-containing compound according to claim 1 wherein said γ-alumina is heated at 600–900° C. and at least one decomposition-assisting gas selected from $H_2$, $O_2$ and $H_2O$ is further added.

3. The process for treating an exhaust gas containing a fluorine-containing compound according to claim 2, further comprising the step of eliminating acidic gases from the treated exhaust gas.

4. The process for treating an exhaust gas containing a fluorine-containing compound according to claim 1, further comprising the step of eliminating acidic gases from the treated exhaust gas.

5. A system for treating an exhaust gas containing a fluorine-containing compound comprising a solids separator for separating solids from said exhaust gas containing a fluorine-containing compound and a catalytic treatment apparatus for catalytically treating the exhaust gas from said solids separator, said catalytic treatment apparatus being packed with a catalyst consisting of a γ-alumina having a crystal structure showing diffraction lines having an intensity of 100 or more at the following five diffraction angles 2θ: 33°±1°, 37°±1°, 40°±1°, 46°±1° and 67°±1° measured by an X-ray diffractometer.

6. The system for treating an exhaust gas containing a fluorine-containing compound according to claim 5, further comprising a means for adding at least one decomposition-assisting gas selected from $H_2$, $O_2$ and $H_2O$ to the exhaust gas from said solids separator.

7. The system for treating an exhaust gas containing a fluorine-containing compound according to claims 6, further comprising an acidic gas eliminating apparatus for eliminating acidic gases from the exhaust gas from said catalytic treatment apparatus.

8. The system for treating an exhaust gas containing a fluorine-containing compound according to claim 6, comprising a means for heating the γ-alumina in said catalytic treatment apparatus at 600–900° C.

9. The system for treating an exhaust gas containing a fluorine-containing compound according to claims 8, further comprising an acidic gas eliminating apparatus for eliminating acidic gases from the exhaust gas from said catalytic treatment apparatus.

10. The system for treating an exhaust gas containing a fluorine-containing compound according to claim 5, comprising a means for heating the γ-alumina in said catalytic treatment apparatus at 600–900° C.

11. The system for treating an exhaust gas containing a fluorine-containing compound according to claims 10, further comprising an acidic gas eliminating apparatus for eliminating acidic gases from the exhaust gas from said catalytic treatment apparatus.

12. The system for treating an exhaust gas containing a fluorine-containing compound according to claims 5, further comprising an acidic gas eliminating apparatus for eliminating acidic gases from the exhaust gas from said catalytic treatment apparatus.

* * * * *